W. A. JONES.
GLASS DRAWING APPARATUS.
APPLICATION FILED JAN. 20, 1912.
1,054,001.
Patented Feb. 25, 1913.
2 SHEETS—SHEET 1.
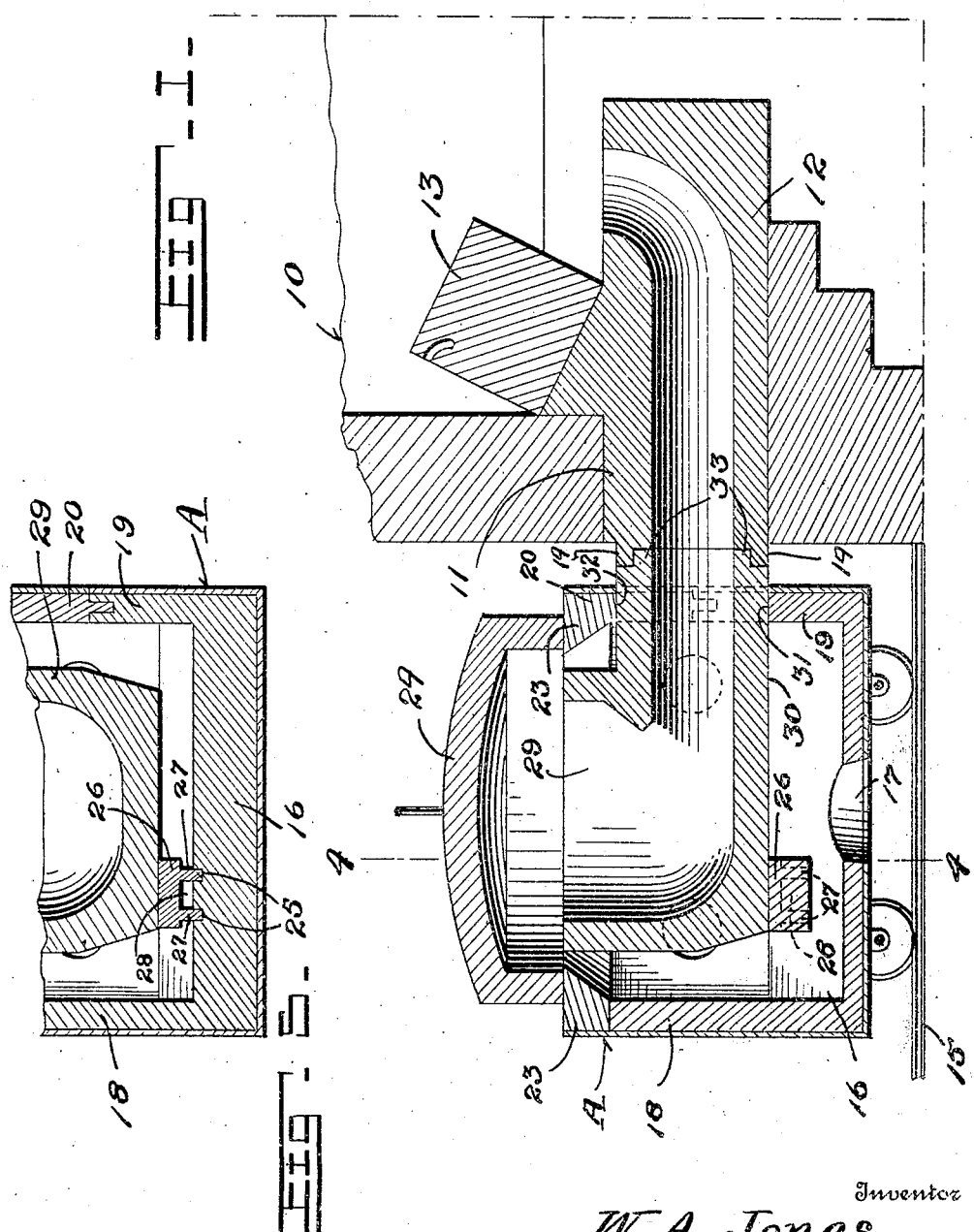

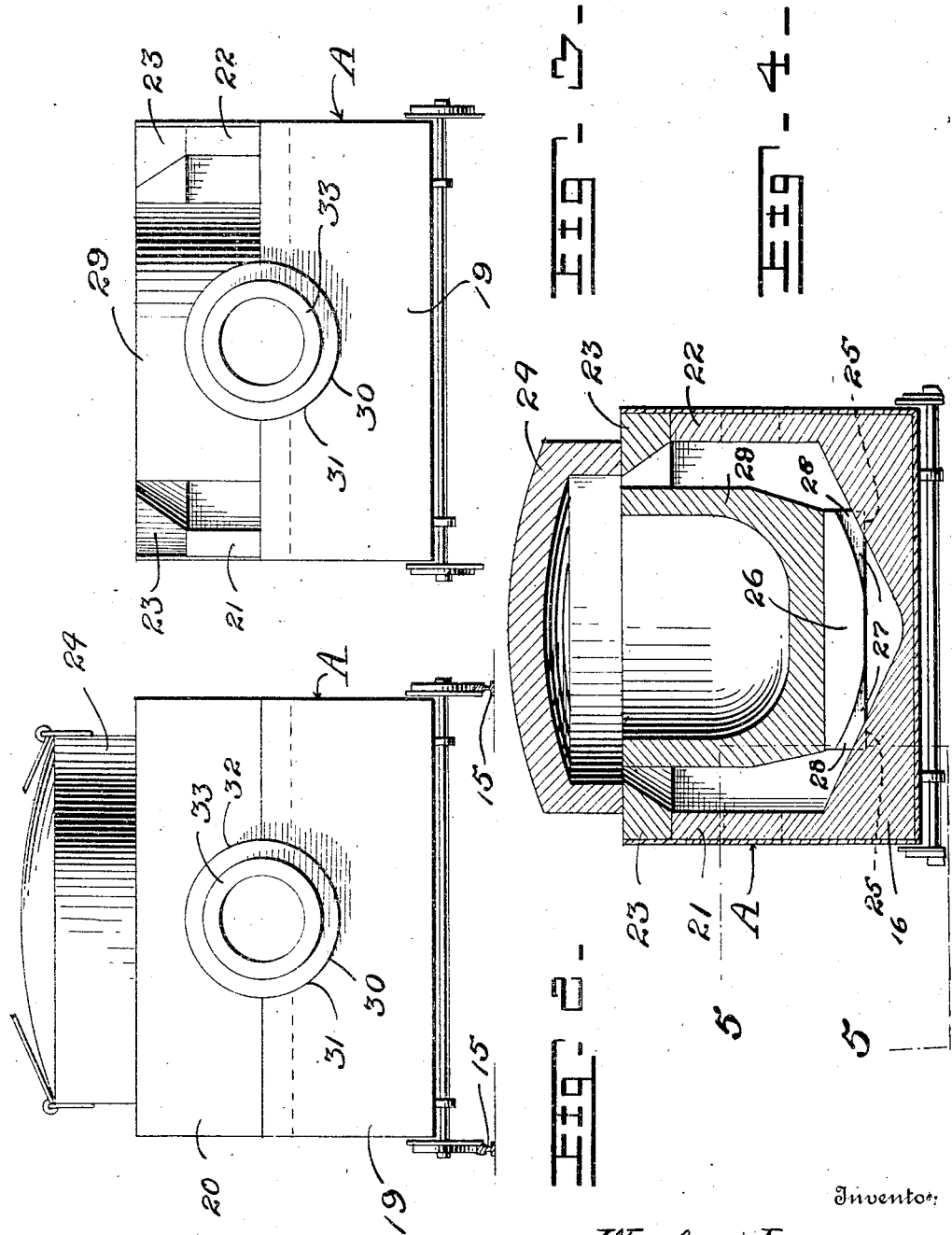

UNITED STATES PATENT OFFICE.

WALTER A. JONES, OF COLUMBUS, OHIO.

GLASS-DRAWING APPARATUS.

1,054,001.  Specification of Letters Patent.  Patented Feb. 25, 1913.

Application filed January 20, 1912. Serial No. 672,349.

*To all whom it may concern:*

Be it known that I, WALTER A. JONES, a citizen of the United States, residing at Columbus, in the county of Franklin, State of Ohio, have invented certain new and useful Improvements in Glass-Drawing Apparatus; and I do hereby declare the following to be a full, clear, and exact description of the invention, such as will enable others skilled in the art to which it appertains to make and use the same.

This invention relates to glass drawing apparatus and particularly to melting tanks having associated therewith exteriorly disposed continuously supplied drawing or working pots. In apparatus of the type referred to the drawing pot and the section of conduit disposed exteriorly of the tank, and connecting said pot with the supply of molten glass within the tank, frequently become injured or broken so as to necessitate their replacement with similar perfect parts. When this condition arises it is necessary that the melting tank be closed down before it is possible to replace the damaged pot and conduit, which will result in loss of time, retardation of output and resultant financial loss.

It is therefore the object of this invention to so construct the drawing pot, associated conduit section, and pot kiln that they may all be moved bodily away from the melting tank to permit of the replacement of injured parts without the necessity of closing down the melting tank and after such replacement of injured parts, may be returned with facility into operative relation to the melting tank.

With the above and other objects in view, the invention consists in the details of construction and in the arrangement and combination of parts to be hereinafter more fully described and particularly pointed out in the appended claim.

In describing the invention in detail, reference will be had to the accompanying drawings wherein like characters of reference denote corresponding parts in the several views, and in which—

Figure 1 is a vertical section of a glass drawing apparatus constructed in accordance with the invention, Fig. 2, an inner end view of the drawing pot kiln with the conduit section formed integral with the pot shown locked in place by the removable wall section of the kiln, Fig. 3, a view similar to Fig. 2 showing the detachable wall section of the drawing pot kiln removed and the drawing pot and conduit section free to be detached from the kiln, Fig. 4, a section on the line 4—4 of Fig. 1, and Fig. 5, a section on the line 5—5 of Fig. 4.

Referring to the drawings, 10 indicates any suitable melting tank having formed in its side wall an opening 11 in which is disposed the delivery end of a conduit 12 leading from the interior of the tank and controlled by a stopper 13. The outer end of the conduit 12 is provided with an annular flange 14 disposed entirely beyond the outer face of the side wall of the tank 10.

Radiating from the tank 10 are spaced rails 15 upon which is adapted to travel a wheeled drawing pot kiln A. This kiln comprises a bottom 16 having a drain opening 17 and its inner face sloping from each side downwardly toward the drain opening 17. The kiln A further includes an outer end wall 18 and a sectional inner end wall including a fixed lower section 19 and a removable upper section 20 supported upon the upper edge of said lower section 19. Rising from the bottom 16 are the usual side walls 21 and 22 which in conjunction with the outer end wall 18 and the upper section 20 of the inner end wall support the kiln roof 23 and this roof is adapted in turn to support a removable hood 24 which covers the drawing pot disposed within the kiln and access to which is had through an opening in the roof 23. The inner face of the bottom 16 of the kiln is provided on each side of the drain opening 17 with a plurality of grooves 25, the grooves on one side of the opening 17 corresponding in number and position to the grooves on the opposite side of said opening. Supported upon the bottom 16 is a block 26 which is provided with a plurality of spaced transverse ribs 27 disposed on its lower side and seating respectively in the grooves 25. The ribs 27 are of greater depth than the grooves 25 so as to form passages 28 whereby molten glass disposed upon the bottom of the kiln may pass freely beneath the block 26 to the drain opening 17. Supported upon the upper face of the block 26 is a drawing pot 29 which has formed integral therewith a conduit section 30 which extends through the sections 19 and 20 of the inner end walls of the kiln. The lower section 19 of the inner end wall of the kiln is provided with a recess 31 which receives the lower portion of the conduit section 30, while the lower edge of the upper section 20 of the inner end wall of the kiln is provided with a recess 32 which receives the upper portion of the conduit section 30 and of course mates with the recess 31. The outer end of the conduit section 30 is provided with a reduced portion 33 adapted to interfit with the flange 14 of the conduit 12 so as to afford uninterrupted communication between the interior of the tank 10 and the drawing pot 29.

By this construction it will be apparent that so long as the drawing pot 29 and conduit section 30 are unimpared the kiln A may be maintained stationary upon the rails 15 in position to effect an interfitting connection between the conduit 12 and the conduit section 30. However, when the drawing pot 29 or the conduit section 30 become injured or broken so as to render replacement necessary it is only essential that the stopper 13 be operated to close the conduit 12 and the kiln A moved along the tracks 15 away from the tank to a suitable location. When this is done the roof 23 is first moved and the section 20 of the inner end wall of the kiln detached. The pot 29 and conduit section can then be removed with facility from the kiln and a new pot and conduit section supplied. After such replacement of parts the section 20 of the inner end wall of the kiln is reapplied as is also the roof 23. The kiln is then moved on the rails 15 until the conduit section carried thereby is brought into interfitting relation to the conduit section 12 of the tank 10 when the operation of the various parts may be again instituted by removing the stopper 13 from closing position with respect to the inlet of the conduit 12.

What is claimed is:

In a glass drawing apparatus, a wheeled pot kiln having a removable top and one side wall of which includes a fixed lower section and a removable upper section, the adjacent edges of said fixed and removable sections being provided with mating recesses forming a passage, a pot mounted in said kiln, a supply conduit projecting laterally from the pot and communicating with the latter beneath its mouth, said conduit extending through the passage in said side wall and locked against upward movement by said removable side wall section, said pot and conduit being thereby adapted for bodily removal from the kiln by the removal of said top and upper side wall section.

In testimony whereof, I affix my signature, in presence of two witnesses.

WALTER A. JONES.

Witnesses:
FRANCIS BOYLE,
GEO. H. CHANDLEE.